(12) United States Patent
Boozer et al.

(10) Patent No.: US 6,585,304 B1
(45) Date of Patent: Jul. 1, 2003

(54) YARD LEAF CADDY

(76) Inventors: John D. Boozer, 1417 SE. Ft. King St., Ocala, FL (US) 34471; Carolyn B. Boozer, 1417 SE. Ft. King St., Ocala, FL (US) 34471

( * ) Notice: Subject to any disclaimer, the term of this patent is extended or adjusted under 35 U.S.C. 154(b) by 0 days.

(21) Appl. No.: 10/201,480

(22) Filed: Jul. 5, 2002

(51) Int. Cl.$^7$ .............................. B62B 1/18; A47F 13/06
(52) U.S. Cl. .............................. 294/55; 220/6; 220/908; 280/47.18; 280/47.26
(58) Field of Search .......................... 220/4.01, 6, 908; 280/47.18, 27.26, 47.24; 294/55, 19.1

(56) References Cited

U.S. PATENT DOCUMENTS

| | | | |
|---|---|---|---|
| 4,350,356 A | * 9/1982 | Crothers | 280/47.26 |
| 4,361,245 A | * 11/1982 | Allen et al. | 220/2 |
| 4,503,661 A | * 3/1985 | Potter | 56/16.6 |
| 4,521,043 A | 6/1985 | Wilsford | |
| D288,493 S | 2/1987 | Lopez | |
| 4,697,834 A | 10/1987 | Scott | |
| 4,796,938 A | * 1/1989 | Knights | 294/55 |
| 5,076,045 A | 12/1991 | McClung, IV | |
| 5,163,278 A | 11/1992 | Martenhoff et al. | |
| 5,205,107 A | 4/1993 | Herink | |
| 5,971,410 A | 10/1999 | Nichols | |
| 6,082,574 A | 7/2000 | Johnson | |
| 6,161,851 A | * 12/2000 | Garner, Jr. | 280/47.29 |
| 6,267,393 B1 | * 7/2001 | Mengrone et al. | 280/37 |
| 6,325,395 B1 | * 12/2001 | Frymoyer | 280/47.26 |

* cited by examiner

*Primary Examiner*—Joseph M. Moy
(74) *Attorney, Agent, or Firm*—Edward M. Livingston, Esq.

(57) ABSTRACT

A yard-leaf caddy has a container floor (1) that is rectangular. Hinged to an aft edge is an aft wall (2) that pivots down forwardly to a storage mode and up rearwardly to a containment mode. Hinged to the front edge is a ramp wall (4) that pivots down forwardly to a ramp mode, that pivots up rearwardly to the containment mode, and that pivots down rearwardly to the storage mode. Hinged to the first-side edge (6) is a first side wall that pivots down second-sidewardly to the storage mode, and that pivots up first-sidewardly to the containment mode. Hinged to the second-side edge is a second-side wall (8) that pivots down first-sidewardly to the storage mode, and that pivots up second-sidewardly to the containment mode. Wheels (10, 11) are positioned to rotate proximate opposite sides of the aft edge. Included in the container floor is an outlet valve (14) for bottom emptying. Handle apertures (21) are included in the ramp wall, the first side wall, the second side wall and the aft wall. All of the walls are lightweight panels for hand-portable light weight in either the storage mode or the containment mode. The yard-leaf caddy has a width that allows the container floor to straddle a top of a predetermined garbage can (15) and that allows the ramp wall to enter a predetermined garbage bag (19) for being emptied. The walls have heights that allow them to be folded downwardly towards each other without overlapping. Typically, exclusive of wheel dimensions, the yard-leaf caddy has an overall width of about thirty inches, an overall length of about thirty-six inches and a height of about twelve inches. The wheels are preferably lightweight with diameters of approximately seven inches.

22 Claims, 6 Drawing Sheets

FIG. 17
FIG. 18
FIG. 19
FIG. 20
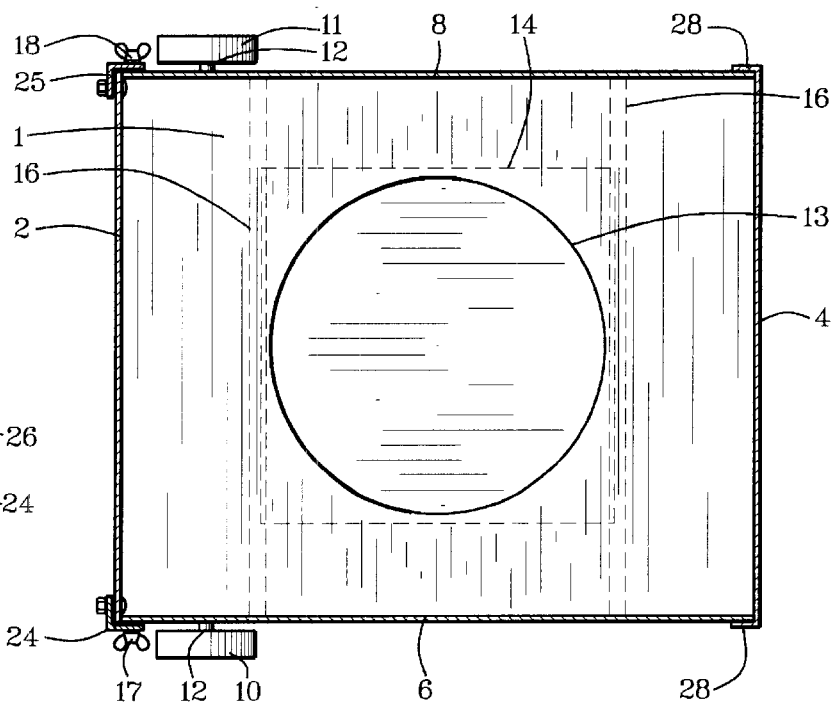
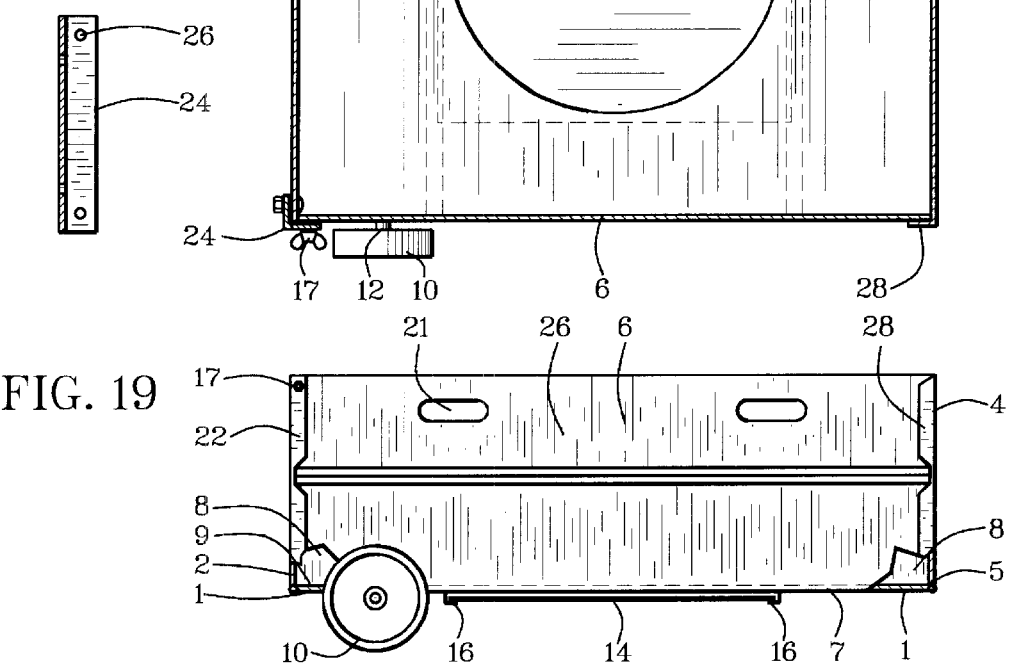
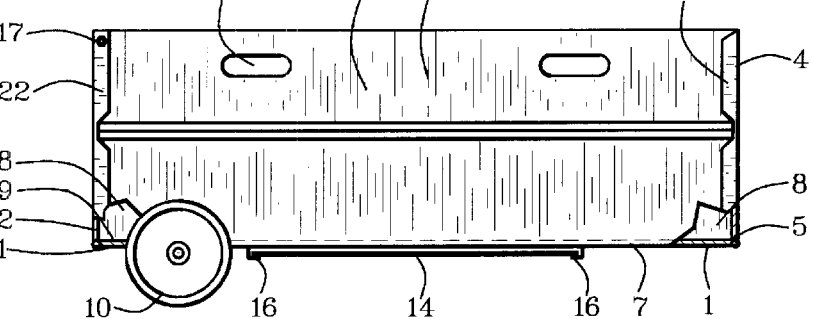
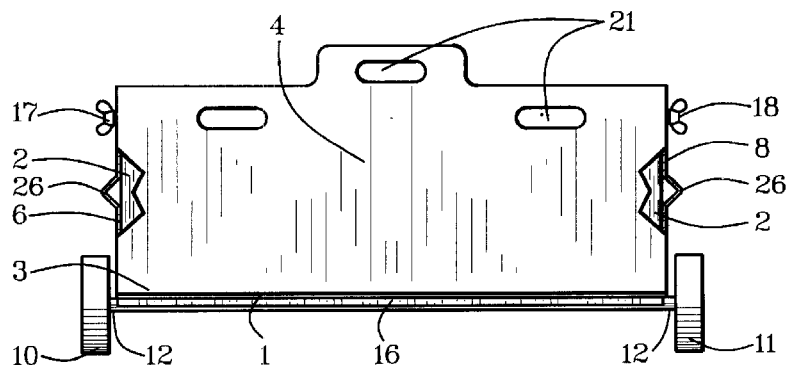

YARD LEAF CADDY

BACKGROUND OF THE INVENTION

This invention relates to yard-leaf containers and more particularly to a yard-leaf caddy that is mobile, hand-portable and foldable for hauling leaves and debris from around residential yards to disposal containers and then foldable for storage in residential facilities.

There are numerous known carts, boxes, pans, trays and other containers for hauling leaves and debris from around residential and small-business yards to disposal containers. None are known, however, to be mobile on wheels, light for hand-portability and foldable for storage in a manner taught by this invention.

Examples of most-closely related known but different devices are described in the following patent documents:

| U.S. Pat. No. | Inventor | Issue Date |
| --- | --- | --- |
| 4,521,043 | Wilsford | 06-04-1985 |
| 6,082,574 | Johnson | 07-04-2000 |
| 4,796,938 | Knights | 01-10-1989 |
| 5,076,045 | McClung, IV | 12-31-1991 |
| 5,971,410 | Nichols | 10-26-1999 |
| Des 288,493 | Lopez | 02-24-1987 |
| 5,205,107 | Herink | 04-27-1993 |
| 4,697,834 | Scott | 10-06-1987 |
| 5,163,278 | Martenhoff, et al. | 11-17-1992 |

SUMMARY OF THE INVENTION

Objects of patentable novelty and utility taught by this invention are to provide a yard-leaf caddy which:

- is light and foldable for hand portability and compact storage in residential facilities,
- is mobile on wheels for hauling leaves and other debris in residential yards to containers for pickup by garbage collectors;
- is conveniently loadable with a yard rake; and
- is conveniently unloadable in either a garbage bag or a garbage can.

This invention accomplishes these and other objectives with a yard-leaf caddy having a container floor that is rectangular with an aft edge, a front edge, a first-side edge and a second-side edge. Hinged to the aft edge is an aft wall that pivots down forwardly to a storage mode which is parallel to the container floor and up rearwardly to a containment mode which is orthogonal to the container floor. Hinged to the front edge is a ramp wall that pivots down forwardly to a ramp mode which is variably parallel to the container floor, that pivots up rearwardly to the containment mode which is orthogonal to the container floor, and that pivots down rearwardly to the storage mode which is parallel to the container floor. Hinged to the first-side edge is a first side wall that pivots down second-sidewardly to the storage mode which is parallel to the container floor, and that pivots up first-sidewardly to the containment mode which is orthogonal to the container floor. Hinged to the second-side edge is a second side wall that pivots down first-sidewardly to the storage mode which is parallel to the container floor, and that pivots up second-sidewardly to the containment mode which is orthogonal to the container floor. Wheels are positioned to rotate proximate opposite sides of the aft edge. Included in the container floor is a floor valve for bottom emptying. Handle apertures are included in the ramp wall, the first side wall, the second side wall and the aft wall. All of the walls are lightweight panels for hand-portable light weight of the yard-leaf caddy in either the storage mode or the containment mode. The yard-leaf caddy has a width that allows the container floor to straddle a top of a predetermined garbage can and that allows the ramp wall to enter a predetermined garbage bag for being emptied. The walls have heights that allow them to be folded downwardly towards each other without overlapping. Typically, exclusive of wheel dimensions, the yard-leaf caddy has an overall width of about thirty inches, an overall length of about thirty-six inches and a height of about twelve inches. The wheels are preferably lightweight with diameters of approximately seven inches.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

FIG. 17 is a top view in the containment mode and showing an optional angle wall that is attachable for fastening aft corners;

FIG. 18 is a side elevation view of the angle wall of the FIG. 17 illustration;

FIG. 19 is a partially cutaway side elevation view showing an optional stiffener angle in side walls; and FIG. 20 is a partially cutaway front view of the FIG. 19 illustration.

DESCRIPTION OF PREFERRED EMBODIMENT

Figure 1:
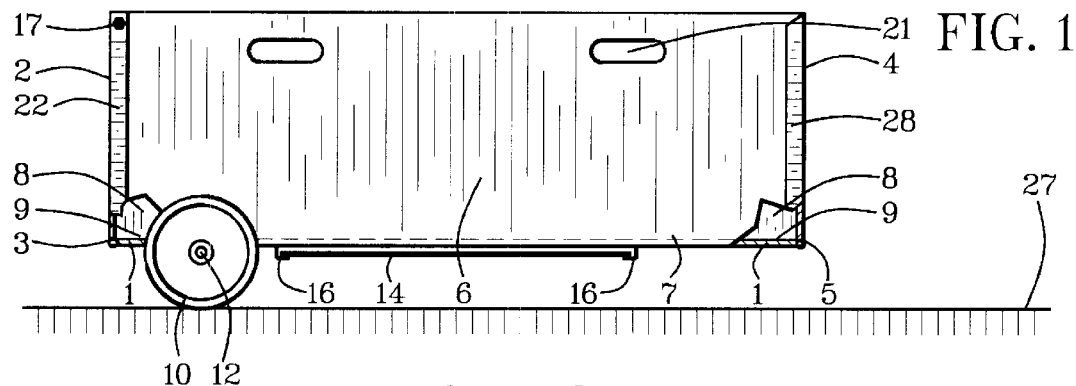
FIG. 1 is a partially cutaway side view of the yard-leaf caddy in a containment mode.
Figure 2:
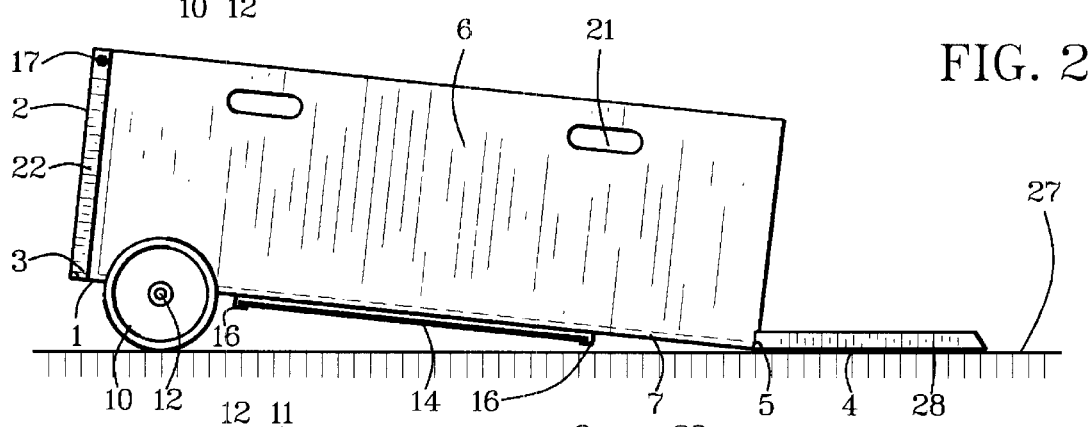
FIG. 2 is a side view in a ramp mode.

Listed numerically below with reference to the drawings are terms used to describe features of this invention. These terms and numbers assigned to them designate the same features throughout this description.

1. Container floor
2. Aft wall
3. Aft-wall bottom edge
4. Ramp wall
5. Ramp-wall bottom edge
6. First-side wall
7. First-side bottom edge
8. Second-side wall
9. Second-side bottom edge
10. First wheel
11. Second wheel
12. Axle
13. Outlet aperture
14. Outlet valve
15. Garbage can
16. Slide members
17. First-aft fastener
18. Second-aft fastener
19. Garbage bag
20. Caddy entrance
21. Handle aperture
22. First corner wrap
23. Second corner wrap
24. First angle wall
25. Second angle wall
26. Stiffener channel
27. Ground surface
28. Ramp-edge walls
29. Side-wall hinge
30. End-wall hinge Referring to FIGS. 1–8, a yard-leaf caddy has a container floor 1 that is rectangular with an aft edge, a front edge, a first-side edge and a second-side edge. An aft wall 2 has an aft-wall bottom edge 3 that is hinged to the aft edge of the container floor 1. A ramp wall 4 has a ramp-wall bottom edge 5 that is hinged to the front edge of the container floor 1. A first-side wall 6 has a first-side bottom edge 7 that is hinged to the first side of the container floor 1. A second-side wall 8 has a second-side bottom edge 9 that is hinged to the second side of the container floor 1.

Referring to the drawings as indicated, the aft wall 2 is pivotal down forwardly to a storage mode, shown in; FIGS. 7–8, and 10–13, which is proximate to parallel to the container floor 1 and is pivotal up rearwardly to a containment mode, shown in FIGS. 1, 3–5, 9, and 15, 17 and 19–20, which is proximate orthogonality to the container floor 1. The ramp wall 4 is pivotal down forwardly to a ramp mode, shown in FIGS. 2, 14 and 16, which is variably parallel to the container floor 1. The ramp wall 4 is pivotal up rearwardly to the containment mode which is proximate orthogonality to the container floor 1. The ramp wall 4 is pivotal down rearwardly to the storage mode which is proximate parallel to the container floor 1. The first-side wall 6 is pivotal down second-sidewardly to the storage mode which is proximate parallel to the container floor 1 and is pivotal up first-sidewardly to the containment mode which is proximate orthogonality to the container floor 1. The second-side wall 8 is pivotal down first-sidewardly to the storage mode which is proximate parallel to the container floor 1 and is pivotal up second-sidewardly to the containment mode which is proximate orthogonality to the container floor 1.

A first wheel 10 proximate the aft edge of the first-side edge of the container floor 1 and a second wheel 11 proximate the aft edge of the second-side edge of the container floor 1 have axes, preferably on a single axle 12, that are parallel to the aft edge of the container floor 1.

Figure 3:
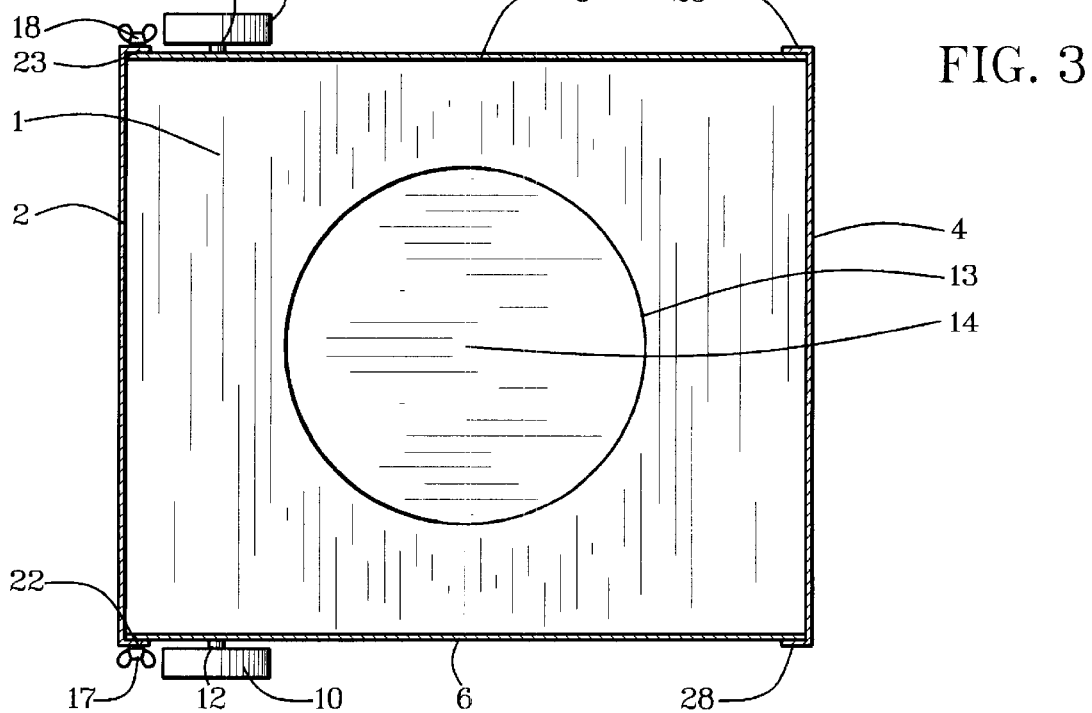
FIG. 3 is a top view in the containment mode.
Figure 4:
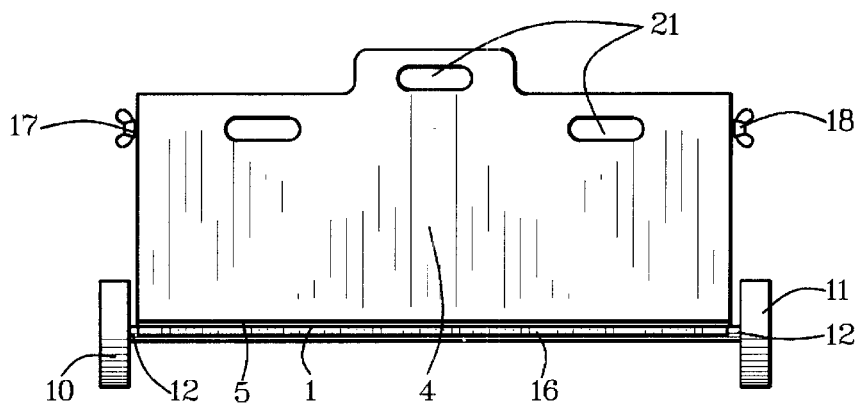
FIG. 4 is a front view in the containment mode.
Figure 5:
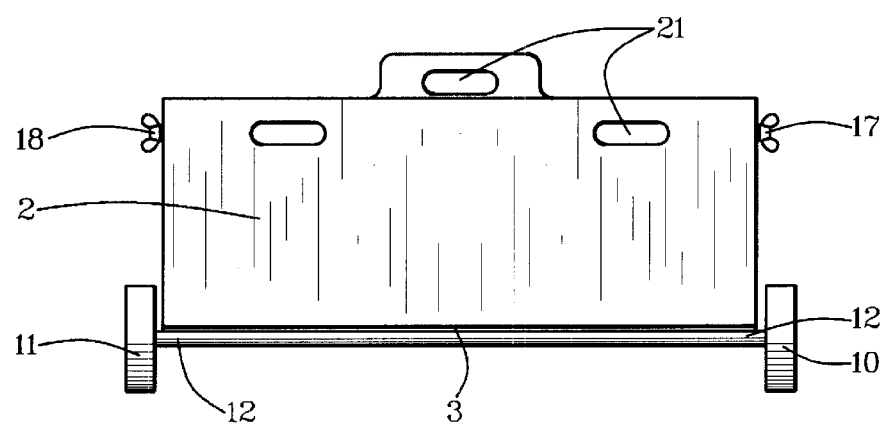
FIG. 5 is a rear view in the containment mode.
Figure 6:
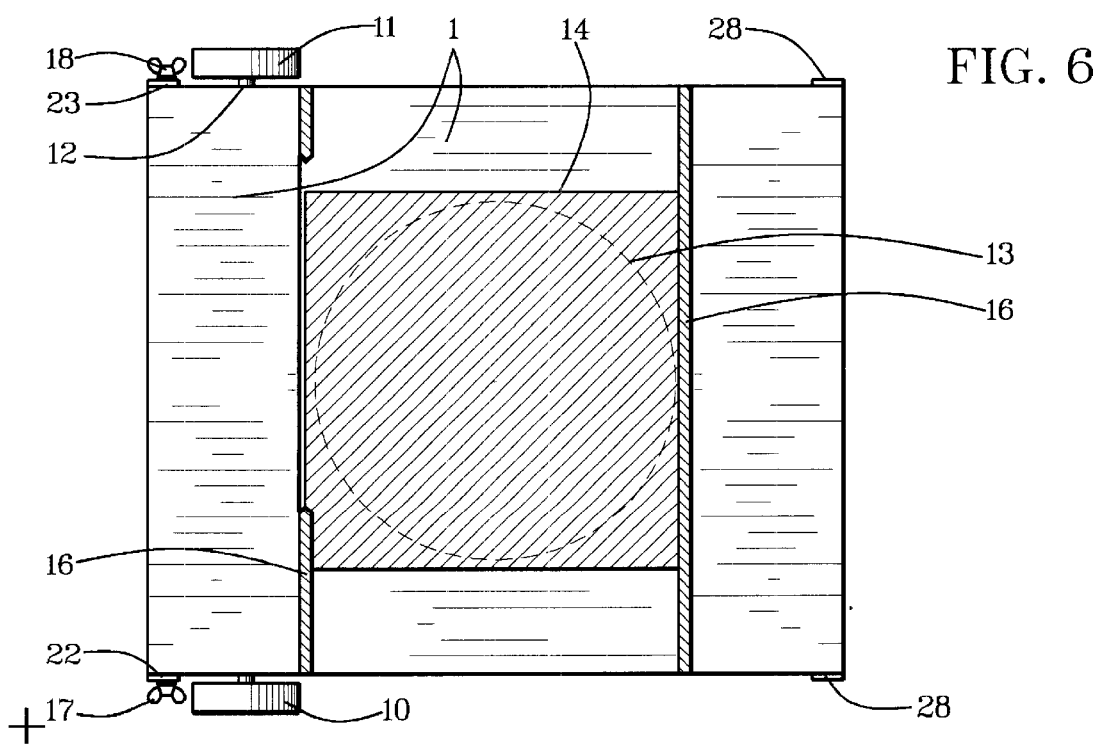
FIG. 6 is a partially cutaway bottom view in the containment mode.
Figure 7:
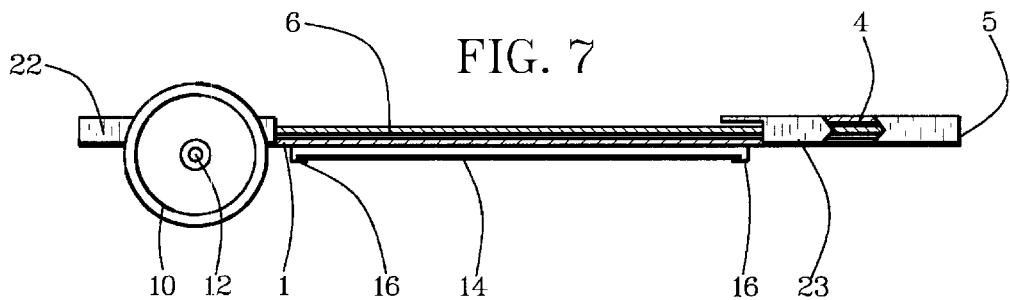
FIG. 7 is a partially cutaway side view in a storage mode.
Figure 8:
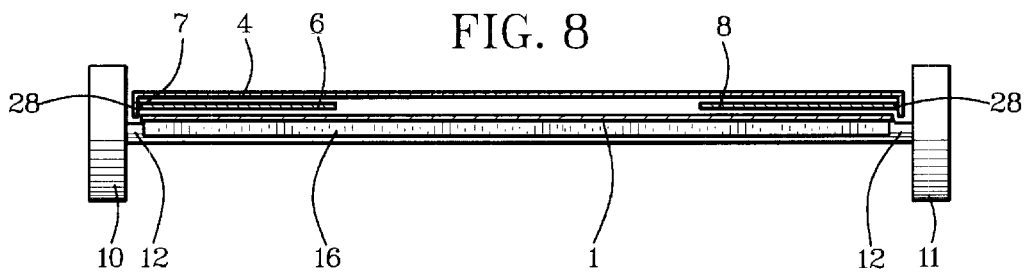
FIG. 8 is a front view in the storage mode.
Figure 9:
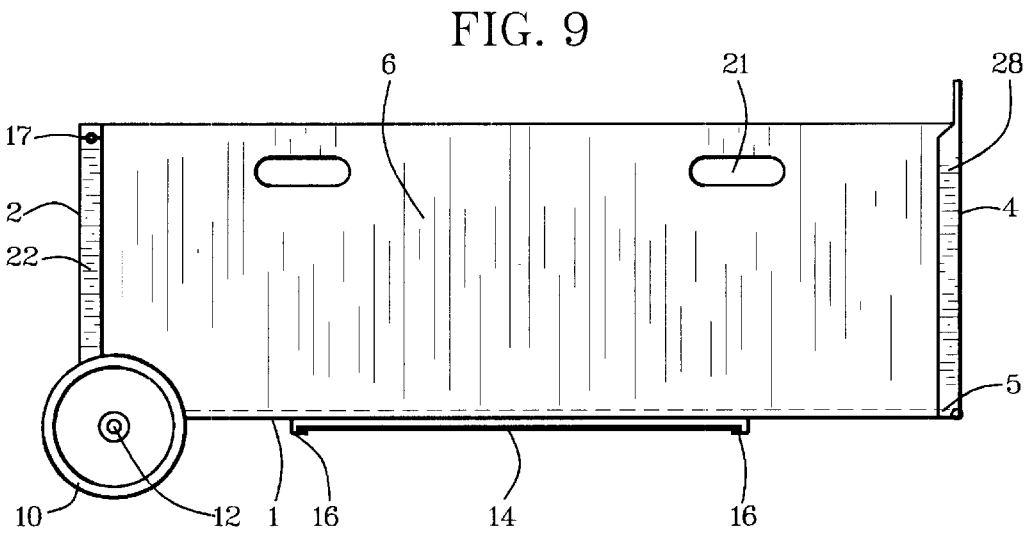
FIG. 9 is a side view of an embodiment having extended wheels in the containment mode.
Figure 10:
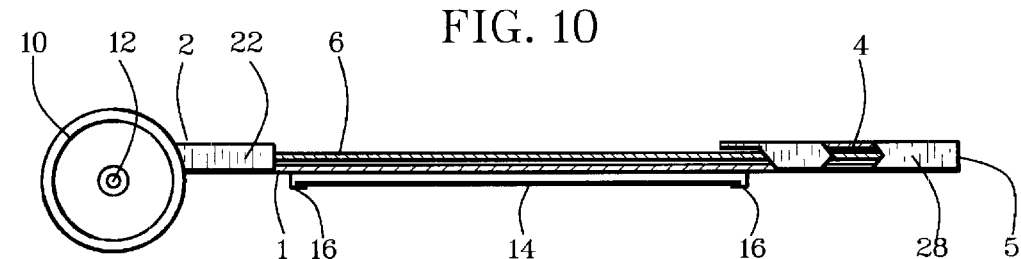
FIG. 10 is a partially cutaway side view of the FIG. 9 embodiment in the storage mode.
Figure 11:
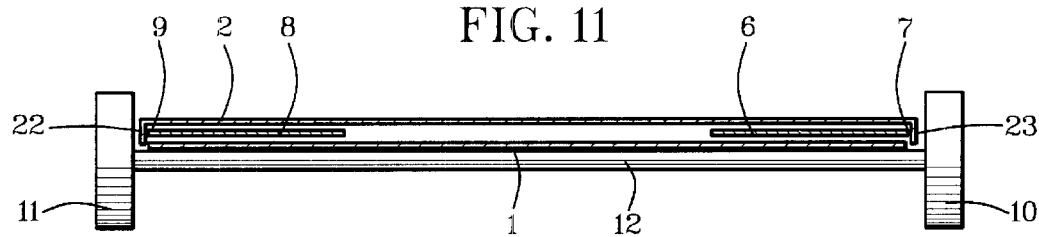
FIG. 11 is a front view of the FIG. 9 embodiment in the storage mode.
Figure 15:
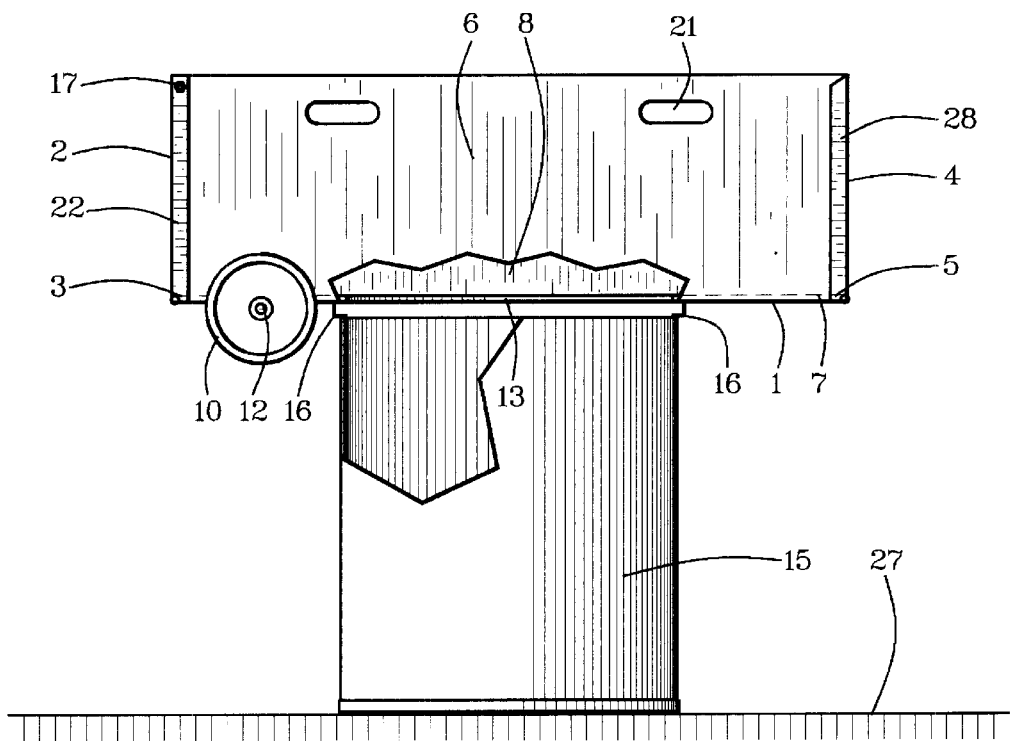
FIG. 15 is a partially cutaway side view of the FIG. 1 embodiment in the containment mode and showing relationship of an outlet aperture in the container floor to a trash can for bottom discharge.

An outlet aperture 13 in the container floor 1 has an outlet valve 14 for bottom discharge through the outlet aperture 13 selectively. The outlet aperture 13 is preferably circular with a diameter predeterminedly comparable to a diameter of an inside periphery of a predetermined garbage can 15 as shown in FIG. 15. The outlet valve 14 can include a slide panel that slides on slide members 16 for being slid sidewardly to a closed mode as shown in FIGS. 3, 6 and 17 or for being slid opposite-sidewardly to an open mode or removed with the outlet aperture 13 being uncovered as shown in FIG. 15.

A first-aft fastener 17 is positioned predeterminedly proximate tops of an aft edge of the first-side wall 6 and a first-side edge of the aft wall 2. It is articulated to fasten a top of the first-side wall 6 to a top of the aft wall 2 in the containment mode selectively. A second-aft fastener 18 is positioned predeterminedly proximate tops of an aft edge of the second-side wall 8 and a second-side edge of the aft wall 2. It is articulated to fasten a top of the second-side wall 8 to a top of the aft wall 2 in the containment mode selectively.

The aft wall 2 has an aft-wall height; the ramp wall 4 has a ramp-wall height; the first-side wall 6 has a first-wall height; and the second-side wall 8 has a second-wall height. The container floor 1 has a floor length that is predeterminedly greater than the aft-wall height in addition to the ramp-wall height; and the container floor 1 has a floor width that is predeterminedly greater than the first-wall height in addition to the second-wall height.

Figure 14:
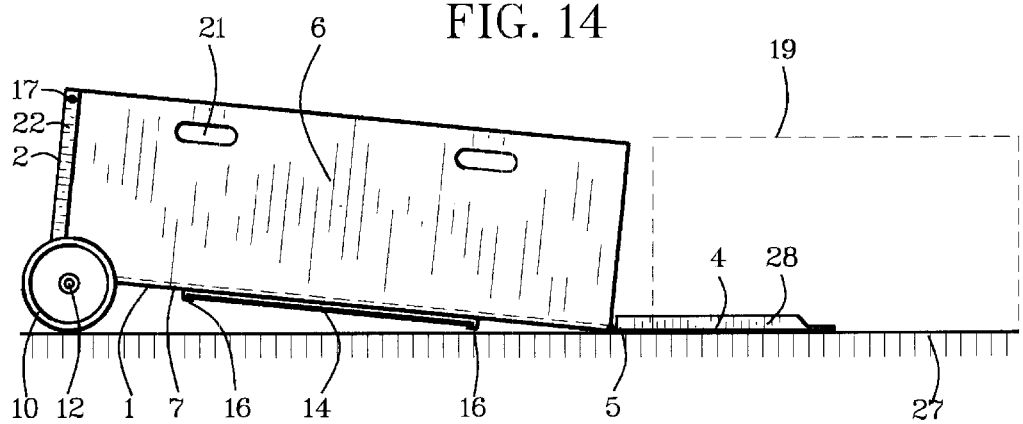
FIG. 14 is a side view of the FIG. 9 embodiment in the ramp mode and showing relationship to a trash bag or other ground-surface container.
Figure 16:
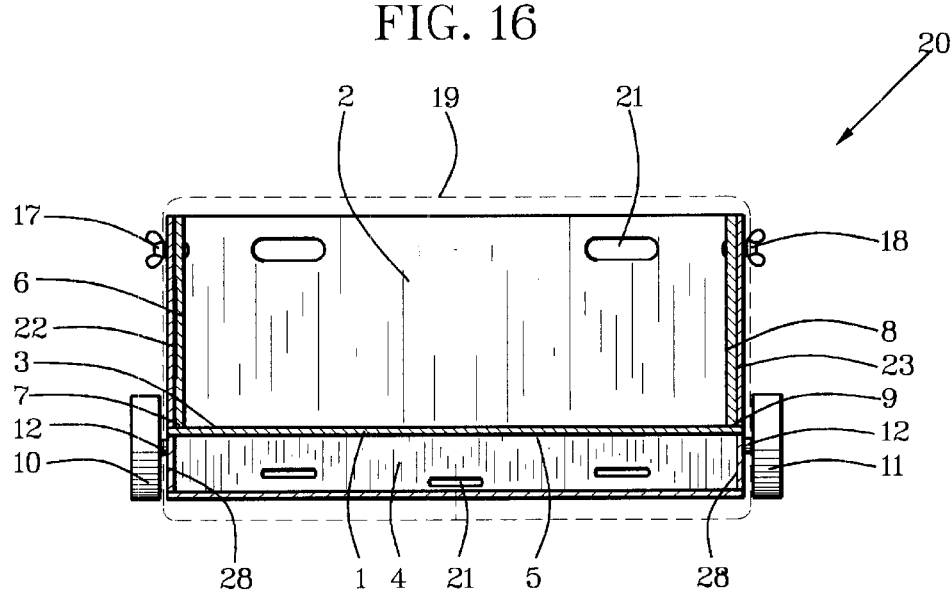
FIG. 16 is a front view of the FIG. 1 embodiment in the ramp mode and showing a leaf-caddy entrance.

The ramp wall 4 has a ramp width that is articulated to be extended predeterminedly into a predetermined garbage bag 19, represented by dashed lines in FIGS. 14 and 16 to include any ground-surface container or disposition site, with the ramp wall 4 in the ramp mode.

As depicted particularly in a front view in FIG. 16, the first-wall height with the first-side wall 6 pivoted to the containment mode, the second-wall height with the second-side wall 8 pivoted to the containment mode and the ramp width combined define a caddy entrance 20. The caddy entrance 20 is articulated to be extended predeterminedly into the predetermined garbage bag 19.

As shown in FIGS. 4–5, 16 and 20, the ramp wall 4 has at least one ramp caddy handle that can include a handle aperture 21 that is articulated to receive a user's hand. A plurality of caddy handles that can be the handle apertures 21 include at least one ramp caddy handle on the ramp wall 4, at least one first-side caddy handle on the first-side wall 6, at least one second-side caddy handle on the second-side wall 8, and at least one aft caddy handle on the aft wall 2. Optional handles can include straps and lines. Particularly for towing in the containment mode, a ramp caddy handle can include a line, strap or rod with length for allowing horizontality of the container floor 1 and with the ramp wall 4 fastened in an upright orientation.

For sealing and fastening aft corners, a first corner wrap 22 proximate the first aft fastener 17 is extended orthogonally forward from the first-side edge of the aft wall 2. Correspondingly, a second corner wrap 23 proximate the second aft fastener 18 is extended orthogonally forward from the second-side edge of the aft wall 2. Optionally as shown in FIGS. 17–18, the aft corners can be sealed and fastened with a first angle wall 24 and a second angle wall 25. The first angle wall 24 is extended orthogonally forward from the first-side edge of the aft wall 2 for containing a fastener for fastening the first angle wall 24 to the first-side edge of the aft wall 2 to fasten the aft wall 2 to the first-side wall 6 in the containment mode. The second angle wall 25 is extended orthogonally forward from the second-side edge of the aft wall 2 for containing a fastener for fastening the second angle wall 24 to the seconds-side edge of the aft wall 2 to fasten the aft wall 2 to the second-side wall 8 in the containment mode.

The first-aft fastener 17 and the second-aft fastener 18 can include bolts extended through the first angle wall 24 and the first-side wall 6 and correspondingly through the second angle wall 25 and the second-side wall 8 for receiving fastener nuts on opposite ends.

The container floor 1, the aft wall 2, the ramp wall 4, the first-side wall 6 and the second-side wall 8 are made of lightweight material having material strength and stiffness for supporting predeterminedly light loads of leaves and other yard debris selectively while also being carried by the user. Also, the first wheel 10 and the second wheel 11 include lightweight wheels suitable for supporting the predeterminedly light loads of leaves. Preferably, the lightweight material is an aluminum alloy so thin and light that it needs a stiffener channel 26 in the first-side wall 6 and in the second-side wall 8 as shown in FIGS. 19–20. Optionally, the lightweight material can be resin-reinforced jute cloth on opposite sides of a foam filler. This is lighter than aluminum per strength and rigidity and is more user friendly for handling with the handle apertures 21. Although not common on the market, the components are readily available at low cost and can be specialty manufactured at low cost.

The containment mode of the yard-leaf caddy includes the aft wall 2 pivoted up rearwardly from the storage mode to being orthogonal to the container floor 1, which is approximately vertical in an operative orientation. The ramp wall 4 is pivoted up forwardly from the storage mode to being approximately vertical. The first-side wall 6 is pivoted up first-sidewardly from the storage mode to being approximately vertical. The second-side wall 8 is pivoted up second-sidewardly to being approximately vertical. The first-side wall 6 is fastened to the aft wall 2 and the second-side wall 8 is fastened to the aft wall 2.

The ramp mode of the yard-leaf caddy includes ramp wall 4 pivoted down forwardly to contact with a ground surface 27, the front edge of the container floor 1 resting on the ground surface 27 and the aft edge of the container floor 1 resting on the axles or axle 12 of the first wheel 10 and the second wheel 11.

Preferably the ramp wall 4 includes ramp-edge walls 28 that serve a dual purpose. They prevent side-escape of leaves and/or debris while being raked or swept onto the ramp wall 4 and into the caddy entrance 20 and they also provide ramp stiffness.

Figure 12:
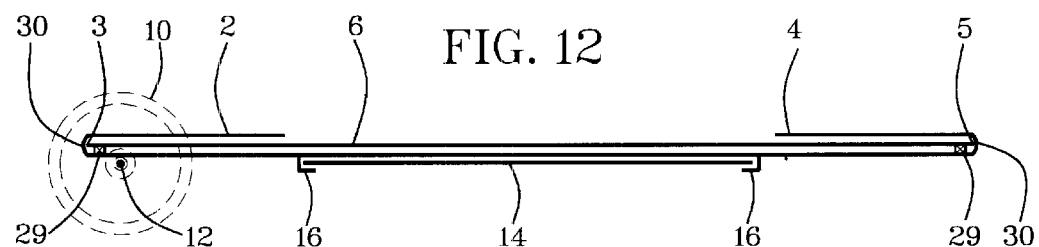
FIG. 12 is a schematic representation of a side view of the FIG. 9 embodiment showing a hinge plan in the storage mode.
Figure 13:
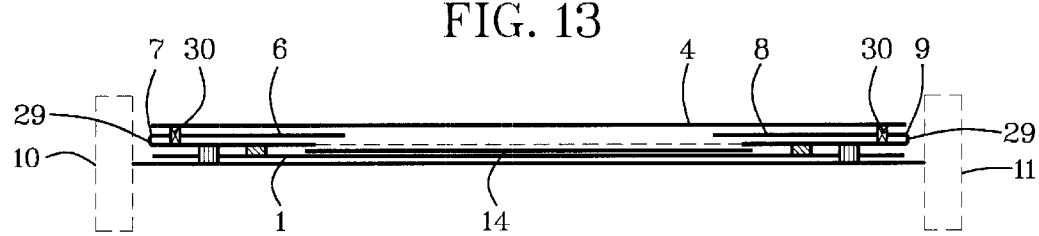
FIG. 13 is a schematic representation of a front view of the FIG. 9 embodiment showing the hinge plan in the storage mode.

As shown in FIGS. 12–13, side-wall hinges 29 for hinging the first-side wall 6 and the second-side wall 8 to sides of the container floor 1 and end-wall hinges 30 for hinging the aft wall 2 and the ramp wall 4 to ends of the container floor 1 can be selected for needs of wall thickness, strength and shape. Adaptations and variations of piano hinges, door hinges, strap hinges and hook hinges can be employed.

The axle 12 for the first wheel 10 and the second wheel 11 can be positioned near the aft wall 2 on the container floor 1 for a wheeled storage mode as shown in FIGS. 9–10, 12 and 14. This also decreases tilt when loaded and being wheeled in the containment mode.

This yard-leaf caddy is intended for average yard-size use, portability and storage. If it is made too big, it will not be useable for filling garbage bags to be put into garbage cans, for being lifted to tops of garbage cans by most female and male residential and small-business users and for being stored readily in increasingly scarce residential and business facilities. If it is made too small, its usefulness decreases. A preferred size is approximately thirty inches wide, thirty-six inches long and twelve inches high, with the wheels being about seven inches in diameter.

Lightness and convenient use size being fundamental and achievable as described and claimed herein, it can be value-engineered to fit a large economic need in present residential and small-business conditions. Aluminum sheeting, a steel axle, steel hinges and steel wheels are preferred for most purposes.

For particularly low cost, light weight, high durability, high impact strength and user friendliness, however, it is foreseeable that the container floor 1 could be made of resined jute cloth (also known as burlap or hessian cloth) on opposite sides of a foam filler. Axles and attachment-hinge orifices could be molded into the container floor 1. The aft wall 2, ramp wall 4, first-side wall 6 and second-side wall 8 could be made similarly with matching features. The first wheel 10 and the second wheel 11 could be made of similar material with the same advantages.

Resined-glass cloth is also a construction-material option, but is heavier and has less impact strength than resined jute cloth of up to about a 10-ounce weight of high Asian-grade quality.

A new and useful yard-leaf caddy having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A yard-leaf caddy comprising:
    a container floor that is rectangular with an aft edge, a front edge, a first-side edge and a second-side edge;
    an aft wall having an aft-wall bottom edge that is hinged to the aft edge of the container floor;
    a ramp wall having a ramp-wall bottom edge that is hinged to the front edge of the container floor;
    a first-side wall having a first-side bottom edge that is hinged to the first-side edge of the container floor;
    a second-side wall having a second-side bottom edge that is hinged to the second-side edge of the container floor;
    the aft wall being pivotal down forwardly to a storage mode which is parallel to the container floor and being pivotal up rearwardly to a containment mode which is orthogonal to the container floor;
    the ramp wall being pivotal down forwardly to a ramp mode which is variably parallel to the container floor, that is pivotal up rearwardly to the containment mode which is orthogonal to the container floor, and that is pivotal down rearwardly to the storage mode which is parallel to the container floor;
    the first-side wall being pivotal down second-sidewardly to the storage mode which is parallel to the container floor, and that is pivotal up first-sidewardly to the containment mode which is orthogonal to the container floor;

the second-side wall being pivotal down first-sidewardly to the storage mode which is parallel to the container floor, and that is pivotal up second-sidewardly to the containment mode which is orthogonal to the container floor;

a first wheel proximate the aft edge of the first-side edge of the container floor;

a second wheel proximate the aft edge of the second-side edge of the container floor;

the first wheel and the second wheel having axes parallel to the aft edge of the container floor;

an outlet aperture in the container floor;

the outlet aperture having an outlet valve for bottom discharge through the outlet aperture selectively;

a first-aft fastener positioned predeterminedly proximate an aft edge of the first-side wall and a first-side edge of the aft wall;

the first-aft fastener being articulated to fasten the first-side wall to the aft wall in the containment mode selectively;

a second-aft fastener positioned predeterminedly proximate an aft edge of the second-side wall and a second-side edge of the aft wall;

the second-aft fastener being articulated to fasten the second-side wall to the aft wall in the containment mode selectively;

the aft wall having an aft-wall height;

the ramp wall having a ramp-wall height;

the first-side wall having a first-wall height;

the second-side wall having a second-wall height;

the container floor having a floor length that is predeterminedly greater than the aft-wall height in addition to the ramp-wall height; and the container floor having a floor width that is predeterminedly greater than the first-wall height in addition to the second-wall height.

2. The yard-leaf caddy of claim 1 wherein:

the container floor is articulated to rest on a top of a predetermined garbage can with the outlet valve positioned for conveyance communication intermediate the outlet aperture and an internal periphery of the garbage can.

3. The yard-leaf caddy of claim 1 wherein:

the ramp wall has a ramp width that is articulated to be extended predeterminedly into a predetermined garbage bag with the ramp wall in the ramp mode.

4. The yard-leaf caddy of claim 3 wherein:

the first-wall height with the first-side wall pivoted to the containment mode, the second-wall height with the second-side wall pivoted to the containment mode and the ramp width combined define a caddy entrance.

5. The yard-leaf caddy of claim 4 wherein:

the caddy entrance is articulated to be extended predeterminedly into the predetermined garbage bag.

6. The yard-leaf caddy of claim 2 wherein:

the first-wall height with the first-side wall pivoted to the containment mode, the second-wall height with the second-side wall pivoted to the containment mode and the ramp width combined define a caddy entrance; and the caddy entrance is articulated to be extended predeterminedly into the predetermined garbage bag.

7. The yard-leaf caddy of claim 1 and further comprising:

at least one ramp caddy handle on the ramp wall.

8. The yard-leaf caddy of claim 7 wherein:

the ramp caddy handle includes a handle aperture that is articulated to receive a user's hand.

9. The yard-leaf caddy of claim 1 and further comprising:

at least one first-side caddy handle on the first-side wall; and at least one second-side caddy handle on the second-side wall.

10. The yard-leaf caddy of claim 9 wherein:

the first-side caddy handle includes the handle aperture that is articulated to receive the user's hand; and the second-side caddy handle includes the handle aperture that is articulated to receive the user's hand.

11. The yard-leaf caddy of claim 1 and further comprising:

at least one aft caddy handle on the aft wall.

12. The yard-leaf caddy of claim 11 wherein:

the aft caddy handle includes the handle aperture that is articulated to receive the user's hand.

13. The yard-leaf caddy of claim 1 and further comprising:

a plurality of caddy handles including at least one ramp caddy handle on the ramp wall, at least one first-side caddy handle on the first-side wall, at least one second-side caddy handle on the second-side wall and at least one aft caddy handle on the aft wall.

14. The yard-leaf caddy of claim 13 wherein:

the plurality of ramp caddy handles include the handle apertures that are articulated to receive the user's hand.

15. The yard-leaf caddy of claim 1 and further comprising:

a first corner wrap proximate the first-aft fastener; and a second corner wrap proximate the second-aft fastener.

16. The yard-leaf caddy of claim 14 wherein:

the first corner wrap includes a first angle wall extended orthogonally forward from the first-side edge of the aft wall for containing a fastener for fastening the first angle wall to the first-side edge of the aft wall to fasten the aft wall to the first-side wall in the containment mode; and the second corner wrap includes a second angle wall extended orthogonally forward from the first-side edge of the aft wall for containing a fastener for fastening the second angle wall to the second-side edge of the aft wall to fasten the aft wall to the second-side wall in the containment mode.

17. The yard-leaf caddy of claim 1 wherein:

the outlet aperture in the container floor is circular with a diameter predeterminedly comparable to a diameter of an inside periphery of the predetermined garbage can.

18. The yard-leaf caddy of claim 1 wherein:

the outlet valve for bottom discharge includes a slide panel that slides on slide members for being slid sidewardly to a closed mode with the slide panel covering the outlet aperture and for being slid opposite-sidewardly to an open mode with the slide panel uncovering the outlet aperture selectively.

19. The yard-leaf caddy of claim 1 wherein:

the container floor, the aft wall, the ramp wall, the first-side wall and the second-side wall are made of lightweight material having material strength and stiff ness for supporting predeterminedly light loads of leaves and other yard debris selectively while also being carried by the user; and the first wheel and the second wheel include lightweight wheels suitable for supporting the predeterminedly light loads of leaves.

20. The yard-leaf caddy of claim 1 wherein:

the storage mode includes the first-side wall pivoted down second-sidewardly to proximate contact with a top surface of a first side of the container floor, the second-side wall pivoted down first-sidewardly to proximate contact with a top surface of a second side of the container floor, the aft wall pivoted down forwardly to proximate contact with a top surface of an aft portion of the first-side wall and to proximate contact with a top surface of an aft portion of the second-side wall, and the ramp wall pivoted down rearwardly to proximate contact with a top surface of a forward portion of the first-side wall and to proximate contact with a top surface of a forward portion of the second-side wall.

21. The yard-leaf caddy of claim 20 wherein:

the containment mode includes the aft wall pivoted up rearwardly from the storage mode to being approximately vertical, the ramp wall pivoted up forwardly from the storage mode to being approximately vertical, the first-side wall pivoted up first-sidewardly from the storage mode to being approximately vertical, the second-side wall pivoted up second-sidewardly to being approximately vertical, the first-side wall being fastened to the aft wall, and the second-side wall being fastened to the aft wall.

22. The yard-leaf caddy of claim 21 wherein:

the ramp mode includes the ramp wall pivoted down forwardly to contact with a ground surface, the front edge of the container floor resting on the ground surface and the aft edge of the container floor resting on axles of the first wheel and the second wheel.

* * * * *